March 29, 1927.
J. R. GAMMETER
1,622,440
TIRE TRIMMING APPARATUS
Filed Oct. 5, 1923  5 Sheets-Sheet 1
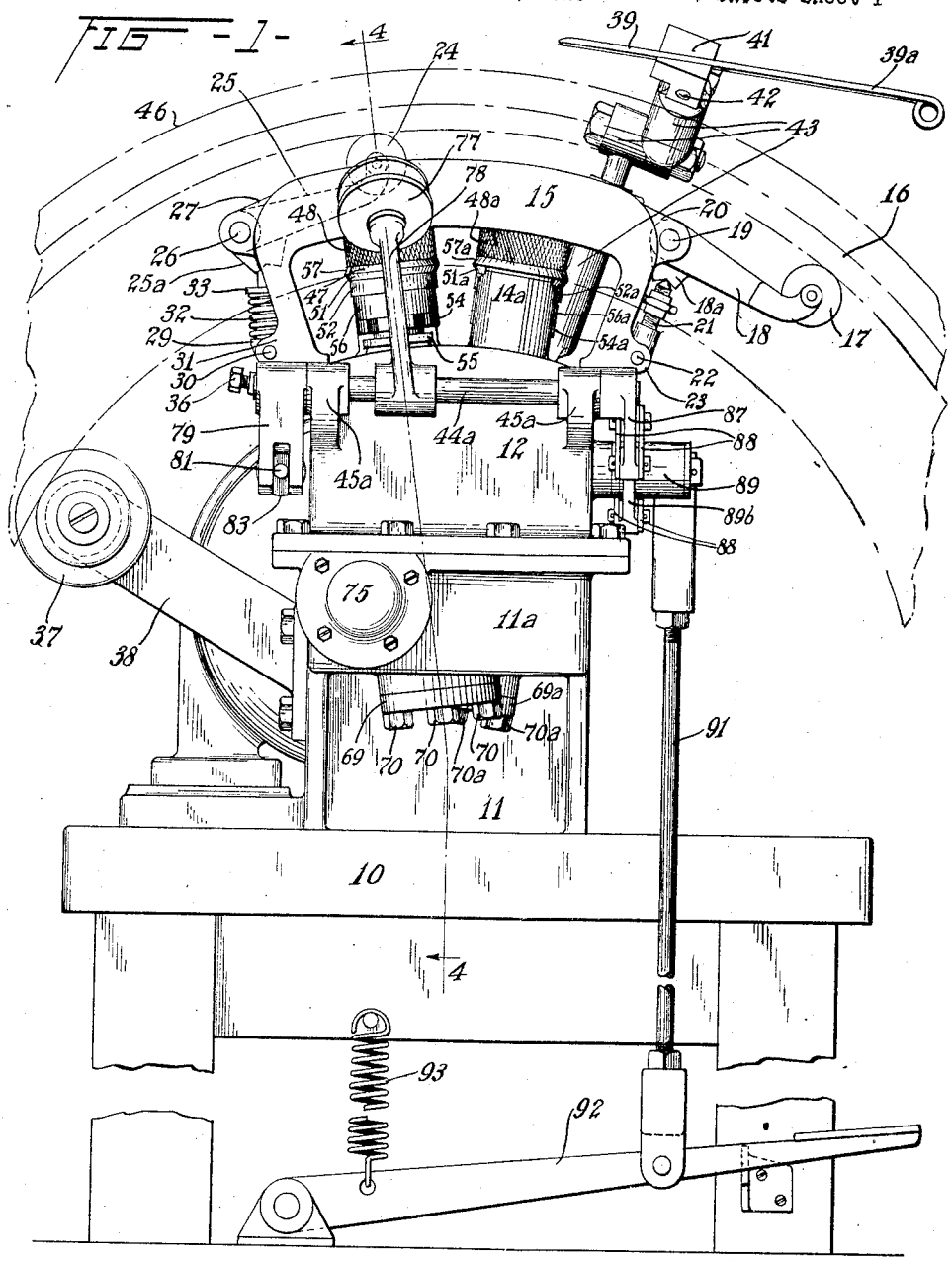
Inventor
John R. Gammeter
By Robert M. Pierson
Atty.

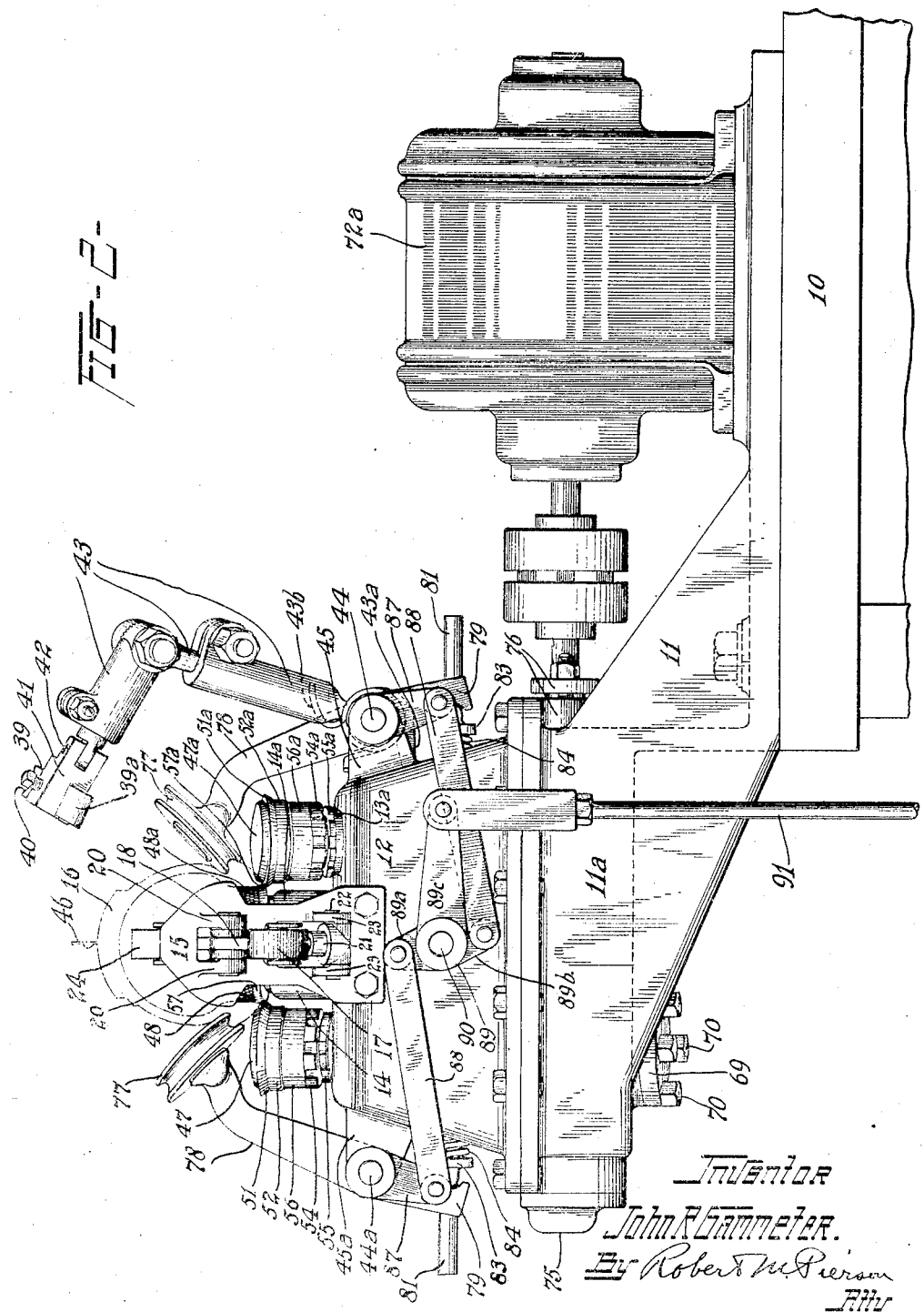

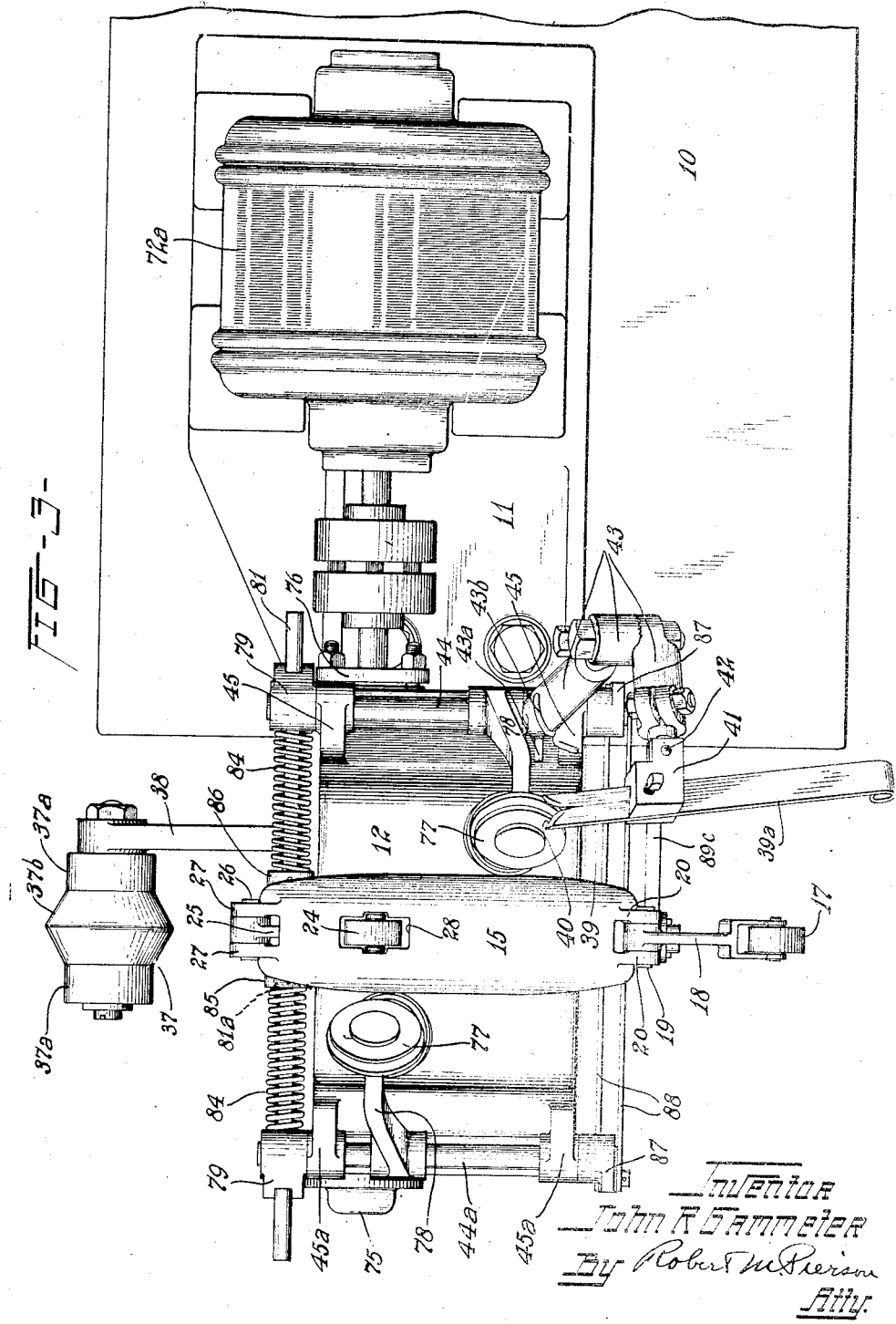

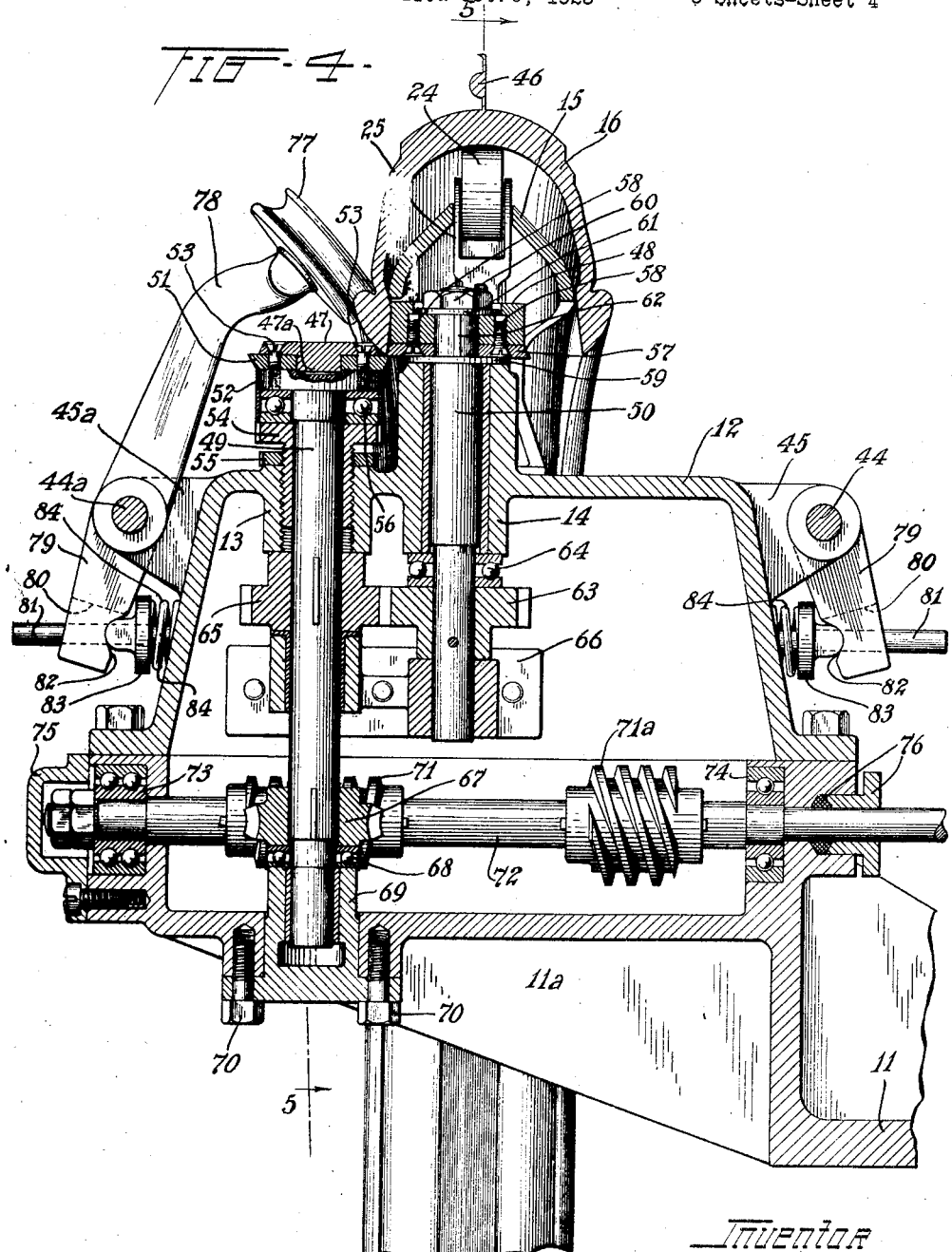

March 29, 1927. 1,622,440
J. R. GAMMETER
TIRE TRIMMING APPARATUS
Filed Oct. 5, 1923 5 Sheets-Sheet 5
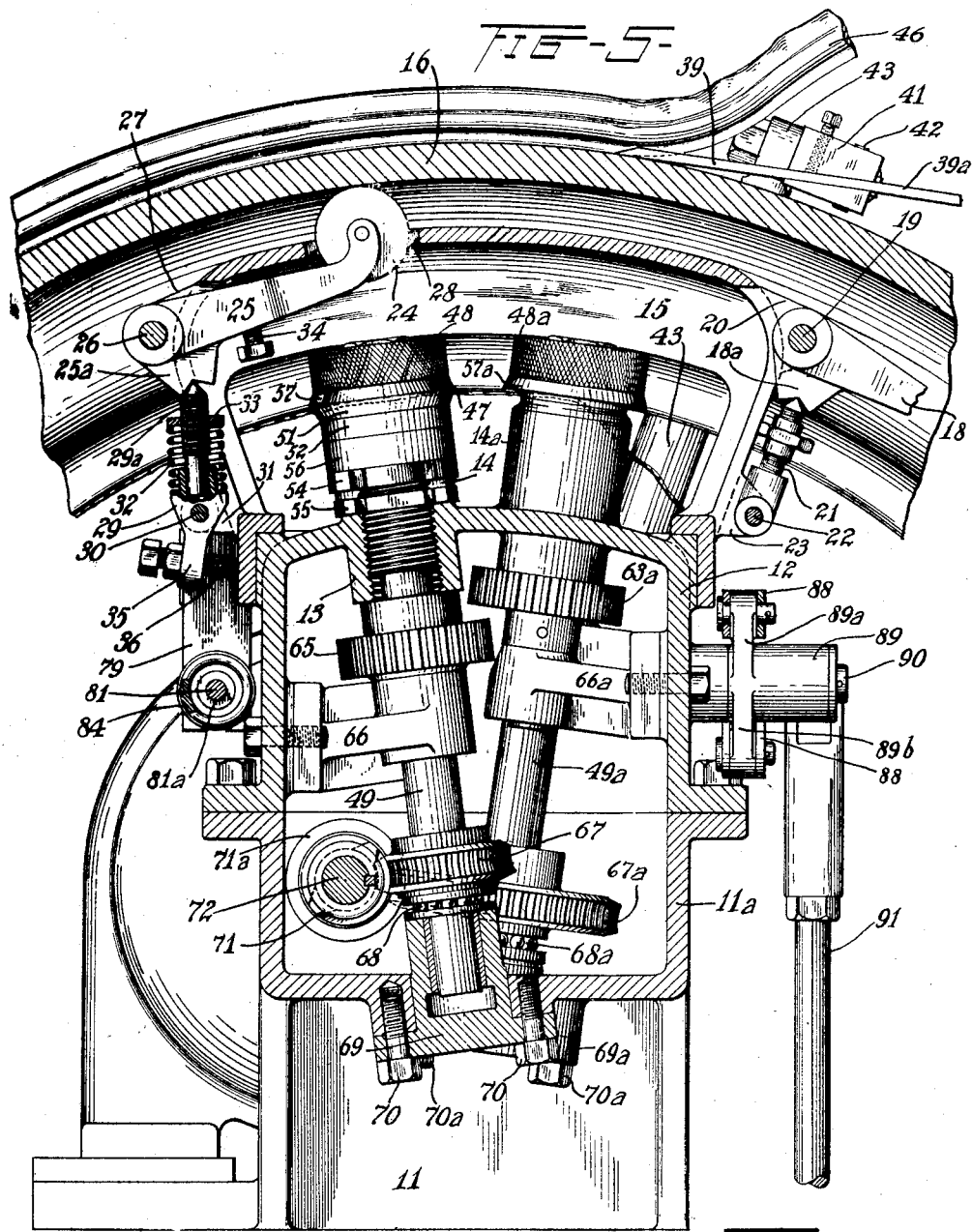
Inventor
John R Gammeter
By Robert M Pierson
Atty Patented Mar. 29, 1927.

1,622,440

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-TRIMMING APPARATUS.

Application filed October 5, 1923. Serial No. 666,721.

This invention relates to the art of trimming overflow rands or fins of surplus rubber from tire casings, a rand or mold fin usually being present at the middle line of the tread of the tire and at the toe of each of the tire beads.

My general object is to provide improved procedure and apparatus for trimming such fins from the tire or casing whereby accurate and smooth trimming may be effected, labor saved, and other advantages obtained. A more specific object is to provide for simultaneous removal of the fins at the tread and at the beads of the tire. A further object is to provide in such apparatus a compact mechanism suitable to be enclosed in a gear casing so as to be run in oil.

In attaining these objects, I provide, in the embodiment of my invention shown in the accompanying drawings, means extending within the tire for supporting the same, rotating it in its own plane and progressively spreading its bead portions apart into approximate parallelism and guiding them past respective pairs of rotary shears adapted to trim the mold fins from the beads while they are so spread apart. Said pairs of rotary shears are spaced apart circumferentially of the tire, and such spacing, in conjunction with the spreading of the beads, permits the use of rotary cutters of large diameter, so that the cutters, having long peripheral cutting edges, are not quickly dulled. This arrangement also permits the cutters to be mounted on shafts disposed radially of the casing, so that the principal bearings and the gearing may be closely grouped and run in oil. It also permits the inner cutter of each pair to be combined with a driving roller in a unitary structure, since the inner surface of the tire against which said drive roller operates is flexed to a plane instead of a coned condition, permitting the drive roller to be of cylindrical form and of approximately the same diameter as the cutter, so that its peripheral speed throughout is appropriate for the feeding of the work without appreciable slippage at any point.

The progressive spreading of the beads also places the side-walls of the tire under strain against the internal spreading and guiding means, whereby the progress of the work past the cutters is steadied, and the tire is so braced by the perpendicularly disposed side-walls at the trimming station as to provide accuracy in the movement of the tread portion of the tire, and support the latter against a V-notched trimming knife, which I provide in such position as to trim the mold fin from the tread of the tire at the station where the latter is so spread open and stabilized.

The spreading of the tire as it passes the trimming station also permits the trimming of the bead fins in such position and with such instrumentalities that the trimming operation is in view of the operator, who is thus enabled to make sure that the trimming is being properly effected at all times, and this feature also provides for accurate trimming of beads on which the fins project at an angle from the toe of the bead.

Of the accompanying drawings:

Fig. 1 is a side elevation of a machine embodying and adapted to carry out my invention in its preferred form, the work being shown in dot-and-dash lines.

Fig. 2 is a front elevation of the same, as viewed from the right of Fig. 1, showing the work in cross section in dot-and-dash lines.

Fig. 3 is a plan view of the machine.

Fig. 4 is a vertical section of the same, and the work thereon, on line 4—4 of Fig. 1.

Fig. 5 is a vertical section of the machine and the work thereon, on line 5—5 of Fig. 4.

Referring, more in detail, to the accompanying drawings, 10 is a table upon which is mounted a bracket 11, formed with a hollow portion 11$^a$, over-hanging from the table, supporting the principal parts of the machine, and constituting the lower half of a gear-case which comprises an upper half or cover 12, the latter being formed in its horizontally disposed top portion with two pairs of bearing sleeves or bosses such as 13, 14. Mounted upon the gear-case cover 12 is an elongated, hollow, arcuate, crowned shoe or guide 15, adapted to enter the tire, 16, and automatically spread it open, when the tire is passed over and hung upon the instrumentalities supported by the overhanging bracket portion 11$^a$, such instrumentalities being so supported as freely to receive the tire. For rotatably supporting the tire by engagement with the inner surface of its tread portion at one circumferential point, a roller 17 is journalled on the outer end of an arm 18, pivoted at 19 between a pair of ears 20, 20, formed upon the guide shoe 15, said arm being adjustably supported by a turnbuckle device 21, pivoted at 22, between ears 23, 23 formed on one leg of the guide shoe 15, and the arm 18 is formed with a notched projection 18ª at its hub, engaged by said turn-buckle device.

For exerting a yielding pressure against the tire at another circumferential point, a roller 24 is journalled on the outer end of an arm 25 pivoted at 26 between ears 27, 27 formed on the opposite end of the guide shoe 15, the arm 25 lying within the hollow guide shoe and the roller 24 projecting upward from the latter through an opening 28 therein. The arm 25 is formed with a notched projection 25ª at its hub engaged by the tapered upper end of a plunger 29ª, for yieldingly holding the arm 25 in an elevated position, said plunger being slidably mounted in the upper end of a guide member 29 pivoted at 30 between a pair of ears 31, 31 formed upon the adjacent leg of the guide shoe 15. The plunger is yieldingly supported by a helical compression spring 32 interposed between a shoulder formed on the guide member 29, and a nut 33 threaded upon the outer end portion of said plunger, whereby the pressure of the roller 24 upon the inner tread wall of the tire may be adjusted. The arm 25 is provided with a set screw 34, adapted to abut the inner face of the guide shoe 15 to limit the upward movement of the roller 24, and for limiting its downward movement the pivoted guide member 29 is formed with a threaded ear 35 projecting downward from its hub and provided with a set screw 36 adapted to abut the adjacent leg of the guide shoe 15, the construction being such as to permit yielding of the roller 24 through a substantial range to compensate slight irregularities in the form or stiffness of the tire while constantly exerting a substantial upward pressure upon the tread portion of the latter.

For supporting the tire at a third circumferential position and for cooperating with the guide shoe 15 accurately to hold the tire in the fixed plane in which it is rotated, a roller 37 (Figs. 1 and 3) is journalled upon the outer end of a bracket 38 projecting from the bracket 11ª, said roller being formed with cylindrical end portions 37ª, 37ª adapted to engage the inner peripheries of the respective beads of the tire, and with a wedge-shaped middle portion 37ᵇ adapted to run between the beads to prevent lateral displacement of the tire. It will be observed that the supporting rollers 17 and 37 engage the tire at points widely separated circumferentially of the tire so that the latter is prevented from swinging in its own plane. The third point of support, represented by the yielding roller 24, may be dispensed with, but is preferably employed for its stabilizing effect upon the tread portion of the tire, helping to hold the tread portion to an even course past the tread-fin trimming knife, which is shown at 39.

Said tread-fin trimming knife is formed with a beveled, V-shaped notch or cutting edge 40 at one end, adapted to straddle the tread-fin of the tire and sever the latter as the tire is rotated, as shown clearly in Fig. 5, and said knife is secured in a clamp 41, pivoted at 42 (Figs. 2 and 3) on the outer end of an adjustably jointed, L-shaped arm-structure 43, the latter being loosely pivoted on a shaft 44 mounted in brackets 45, 45 projecting from the gear-case cover 12, the pivotal axis of said arm structure being parallel with the plane of the work so that the arm structure may be swung over, into the operative position of Fig. 5, with the over-hanging knife-clamping member 41 closely adjacent the tread of the tire, with its pivotal axis 42 in an approximately radial position with respect to the tire, and with the knife 39 disposed tangentially of the tire tread. The arm structure 43, by reason of its jointed construction, is adapted to be adjusted to vary the relation of the knife clamping member 41 to the work, in operative position, and the innermost member of said structure is formed with a projection or stop 43ª adapted to abut the gear-case cover 12, to limit the movement of said structure away from the work, and is provided with a hinge spring 43ᵇ adapted normally to hold said structure clear of the work, with said stop abutting the gear-case, to permit the free mounting and removal of the tire.

The knife 39 is of such length as to provide a handle portion 39ª, beyond its clamping member 41, to be grasped by the operator to swing the arm structure 43 into operative position, with the tangentially disposed knife bearing upon the tread of the tire and with the V-notched cutting edge thereof straddling the tread-fin, 46, so as to sever said fin from the tire as the latter is rotated. As the portions of the knife at each side of the V-notch bear upon the tread in tangential contact, on opposite sides of the fin, the knife is thereby prevented from cutting too deeply, while the beveled or chisel like form of the cutting edge, as well as the pressure which may be exerted by the operator, causes the knife to bear firmly against the tread, in tangential contact, so as to sever the fin approximately flush with the tread, the knife clamping member 41 being turned on its pivot 42 to align the apex of the V-notch with the tread-fin. The clamping member 41 is preferably of short length, as shown, its pivot 42 being not far from the work's line of thrust upon the knife, so that but little manual exertion is required to hold the knife against such thrust, the latter being largely resisted by the arm-structure 43.

The devices for driving the tire and for severing the bead fins therefrom comprise, for each bead, a pair of rollers such as the rollers 47, 48, shown in axial section in Fig. 4, secured upon respective, approximately parallel, radially disposed shafts 49, 50 mounted in the bearing sleeves 13, 14. The roller 47, adapted to bear against the outer face of the bead, is beveled approximately to fit said face in the spread condition of the tire and is formed with an axial boss 47$^a$ extending, with a snug fit, through the axial aperture of an annular, rotary cutter 51 and into a shallow axial bore in a head 52 formed on the upper end of the shaft 49, the roller thus centering said cutter on the shaft and serving as a clamping member therefor under the force of screws 53, 53 securing the roller and the cutter to said head. For radially adjusting the shaft 49, and with it the cutter-roller structure 51, 47 secured thereon, a bushing 54 is threaded into the bearing sleeve 13 and provided with a locknut 55, an anti-friction thrust bearing 56 being interposed between said bushing and the head 52 of the shaft to take the thrust of the cutter in the shearing action of the latter.

The roller 48 is knurled on its driving face and is of approximately cylindrical form, to fit the inner face of the bead of the spread tire. A rotary cutter 57, adapted to coact with the rotary cutter 51, is secured to the under face of said roller by screws 58, 58, and the combined structure of roller and cutter is clamped upon the end of the shaft 50, against a flange 59 formed thereon, by a nut 60 and washer 61, and secured against rotation with relation to said shaft by a spline 62 formed on the latter. The flange 59 is adapted to abut the upper end of the bearing sleeve 14 to take such part of the weight of the shaft 50 and connected parts as is not borne by the cutter 51, which extends slightly under the cutter 57, or to take the entire weight when the lower cutter, 51, is not so adjusted as to bear strongly against the upper cutter. A driving gear 63 is pinned upon the lower end portion of the shaft 50 and an anti-friction bearing 64 is interposed between said gear and the lower end of the bearing sleeve 14 to take the upward thrust of the shaft 50 when the lower cutter 51 is adjusted to bear firmly against the upper cutter 57, as is preferred in the adjustment of the machine for operation. It will be observed that neither of the cutters is backed by any yielding element such as a thrust spring, and although this requires a very accurate axial adjustment of the cutter 51, I find it to be an advantage in that the tough material of the rubber tire-fin is not permitted to wedge the cutters apart and thus prevent a clean shearing action and prematurely dull the cutters.

The driving gear 63 for the shaft 50 is meshed with a driving gear 65 which is slidably keyed upon the shaft 49 so that the latter may be axially adjusted as above described, and immediately below said gears the shafts 49 and 50 are mounted in respective bearings formed in a bracket 66 secured to the inner face of the gear-case cover 12, said bracket being so formed and positioned as to provide a close, running fit of the gears 65 and 63 between said bracket and the bearing sleeve 13 and anti-friction bearing 64 respectively.

The shafts 49 and 50, above described as being approximately parallel and radially disposed are preferably disposed at an angle of about one degree to each other as viewed axially of the work, so that the cutters 51, 57 engage each other only at the shearing point, the teeth of the gears 63, 65 being appropriately formed to operate in their consequent angular relation, as this angular relation of the cutters results in a very clean shearing action and also apparently causes the cutters to remain sharp for a longer time than when they are disposed perfectly parallel to each other.

For driving the work-driving rollers 47, 48 and the cutters 51, 57 secured thereto, the shaft 49 extends downward beyond its bearing bracket 66 and slidably keyed upon its lower portion is a worm gear 67 supported upon an anti-friction thrust bearing 68, the latter being supported by a bushing plug 69 secured by screw bolts 70, 70 in an aperture formed in the floor of the lower gear-case member 11$^a$, said bushing plug being adapted to support the gear 67 accurately in position to mesh properly with a worm 71, keyed upon a drive shaft 72 journalled in the lower gear-case member in anti-friction bearings 73, 74 and having driving connection with a motor 72$^a$ mounted upon the table 10. 75 is an external closure cap sealing the bearing 73 and 76 is a stuffing box for the bearing 74, the bearings of the drive shaft 72 thus being sealed against leakage of oil from the gear-case.

The bead driving rollers and rotary cutters for the rear bead of the tire, and their associated parts, correspond with those above described with relation to the front bead, (and in the drawings are given the same reference numerals, with the exponent "a") except that they are adapted to operate upon the tire at a different station in the orbit of the tire, as will best be seen by reference to Fig. 5. Because of its different station, the radial drive shaft 49$^a$ of the work driving roller 51ª is at a greater distance from the main drive shaft 72, the latter being above the center of revolution of the work, and, in order that the shaft 49ª may nevertheless be driven through the shaft 72 at equal speed with the shaft 49, the worm gear 67ª and the worm 71ª meshed therewith are relatively large and geared in the same speed ratio as the gear 67 and worm 71, and the relation of the gears and worms is such that the latter, being oppositely threaded, counteract each other as to thrust upon the drive shaft 72.

For holding down each of the tire-beads against the drive rollers and in proper relation to the shears, a roller 77 formed with a peripheral groove fitting the heel of the bead is journalled on the end of an arm 78, the arms for the two beads of the tire being secured respectively upon the shaft 44 above mentioned and upon a similar shaft 44ª journalled in brackets 45ª, 45ª, projecting from the gear-case cover at the opposite side of the work. For impelling said shafts to press said rollers yieldingly against the respective beads of the tire, each of said shafts is provided at one end with a rocker arm 79, slotted at its end as indicated at 80 (see Fig. 4), freely to accommodate a spring-rod 81, the latter being common to said rocker arms (see Fig. 3), and each of said rocker arms is notched as shown at 82 (Fig. 4) to receive a semi-cylindrical projection formed on a spring cap 83, the spring caps for the two rocker arms being slidably mounted on the rod 81 and held in the notches 82, so as to support the rod 81 and associated parts, by tandem compression springs 84, 84, the latter encircling the rod 81 and being interposed between the respective spring caps 83 and collars 85, 86 (Fig. 3) mounted upon the middle portion of said rod. The collar 86 is pinned in a fixed position upon said rod while the collar 85 is threaded upon an enlarged portion 81ª of the rod so that it may be adjusted lengthwise thereon, this arrangement being such that the springs 84 are in tandem or opposed to each other, so as to equalize the pressure of the rollers 77, upon the work, notwithstanding adjustment of their force by means of the threaded collar 85.

For withdrawing the bead pressing rollers 77 from the work driving rollers, to permit the insertion and removal of the work, the shafts 44, 44ª, at their ends opposite the rocker arms 77, are provided with rocker arms 87, 87 (see Fig. 2) whose outer ends are connected by respective links 88 with opposite, vertical arms 89ª, 89ᵇ of a three armed lever 89 pivoted on a stub shaft 90 projecting from the side of the gear-case cover 12, and the third arm of said lever, 89ᶜ extending horizontally, is connected by a pull rod 91 with a foot lever 92 (Fig. 1), said foot lever normally being held in an elevated position by a pull spring 93 connecting the same with the frame of the machine, so that the weight of the foot lever and connected parts is not required to be borne entirely by the compression springs 84.

In the operation of the machine, the tread-fin trimming knife and its support being held out of the way by the hinge spring 43ᵇ, the foot lever 92 is depressed, retracting the two pressing rollers 77. The tire is introduced to the machine by passing it axially thereonto and is hung upon the rollers 17, 24 and 37, the wedge-shaped middle portion of the last mentioned roller entering between the beads of the tire and the guide member 15 also entering between the beads and automatically spreading them apart so that as the tire is allowed to descend its bead portions are automatically brought into proper relation to the drive rollers and shears. The machine may be driven while the tire is being mounted, or may be started after the tire is in place, and the foot lever is then released, permitting the springs 84 to throw the bead pressing rollers 77 into operative position and press them against the heels of the beads, thereby holding the latter in driving contact with the driving rollers and in proper shearing relation to the cutters. At the same time the operator swings the tread-fin trimming knife into operating position and holds it in proper relation to the tire by means of its handle portion 39ª. As the tire continues to be rotated the tread-fin and the bead fins are thus simultaneously removed during one revolution of the tire. When the trimming operation is completed, the tire is readily removed by permitting the tread-fin trimming knife to be retracted by the hinge spring 43ᵇ, depressing the foot lever 92 to retract the two presser rollers 77, and then simply lifting the tire from the machine.

The mounting and removal of the work is effected very simply, and the operation is extremely rapid, accurate and largely automatic. Safety and other advantages of enclosing the principal bearings and gears in a gear-case are attained while permitting all usual adjustments to be made without opening the gear-case, and the machine may readily be adjusted to operate upon tires of different sizes.

Modifications may be resorted to without departing from the scope of my invention and I do not wholly limit my claims to the specific construction shown.

I claim,

1. A tire-trimming machine comprising means for rotating a tire in its own plane, means for progressively flexing a side wall thereof laterally as it is so rotated, to cause a toe portion thereof to pass a trimming position, whereby said toe portion is swung away from the cavity within the tire, and means for progressively trimming a mold fin from said toe portion as the latter passes said trimming position.

2. A tire-trimming machine comprising means for rotating a tire in its own plane, means for progressively flexing the side walls thereof so as to cause its toe portions to swing away from the cavity within the tire, to positions such that their inner faces are approximately parallel with the tires plane of rotation, and means for progressively trimming mold fins from said toe portions as they are so progressively flexed.

3. A tire-trimming machine comprising means for rotating a tire in its own plane, means for progressively flexing its side walls as it is rotated so as to cause mold fins at the toes of the beads to project freely from its inner periphery, and means for progressively trimming said mold fins from the tire as it is so rotated and progressively flexed.

4. A tire-trimming machine comprising means for rotating a tire in its own plane, means for so progressively flexing its side walls as it is rotated as to increase its resistance to further deformation under radial pressure applied to its tread portion, and means for progressively trimming a mold fin from its tread portion as it is so rotated and flexed.

5. A tire-trimming machine comprising means for rotating a tire in its own plane and progressively spreading it open at its bead portions, and means for progressively trimming a mold fin from the tire as it is so spread and rotated.

6. A tire-trimming machine comprising means for rotating a tire in its own plane and progressively spreading it open at its bead portions, means for progressively trimming a mold fin from a bead portion of the tire and means for concurrently trimming a mold fin from the tread portion of the tire as the latter is so spread and rotated.

7. A tire-trimming machine comprising two pairs of rotary shears mounted on axes substantially radial with relation to the work, said pairs being so spaced apart laterally of the work as to operate upon the respective beads of a tire so spread open as to bring its inner walls approximately into parallelism with each other, and a roller mounted coaxially with relation to the inner cutter of each pair of shears and adapted to run on the inner face of the respective bead of the tire concurrently with the trimming of a mold fin from the toe of the bead by said shears.

8. A tire-trimming machine comprising two pairs of rotary shears mounted on axes substantially radial with relation to the work, said pairs being spaced apart circumferentially of the work and adapted to operate upon the respective beads of a tire, a drive roller secured coaxially upon the inner cutter of each pair and adapted to act against the inner face of a spread tire casing, and means for guiding and driving the tire in such fixed orbit that its inner bead faces, engaged by said rollers, are approximately parallel as they pass said rollers.

9. A tire-trimming machine comprising means for trimming a mold fin from a bead portion of a tire as the latter is rotated in its own plane, means for supporting the tire and driving it past said means, and manually positionable means for progressively trimming a mold fin from the tread of the tire as the latter is so driven.

10. A tire-trimming machine comprising means for trimming a mold fin from a bead portion of a tire as the latter is rotated in its own plane, means for supporting the tire and driving it past said means, and manually positionable means for progressively severing a mold fin from the tread of the tire as the latter is so driven, the last said means being so mounted as to afford structural resistance to the tangential thrust of the work thereon while being manually positionable in directions transverse to the tangential line of thrust.

11. A tire-trimming machine comprising means for supporting and rotating a tire in its own plane, a trimming knife formed with a V-notched cutting edge at one end adapted to sever a tread-fin from the tire as the latter is so rotated, and an arm structure constituting a mounting for said knife, said arm structure being pivoted to swing from and toward the work at a side thereof and adapted to hold said knife in tangential relation to the work, against the force of the latter, while permitting its cutting end to be manually positioned transversely of the work.

12. A tire-trimming machine comprising means for progressively spreading a tire at its bead portions as it is rotated in its own plane, means constraining the beads of the tire to pass a fixed station as the tire is so rotated, and a V-notched trimming knife positionable in operative relation to the tire to sever a tread-fin therefrom at approximately the same station as that of said bead constraining means in the orbit of the work.

13. A tire-trimming machine comprising pairs of rotary shears mounted upon axes approximately radial of the work and adapted to trim the respective bead portions of a tire as the latter is rotated in its own plane, and work-driving or guiding rollers mounted coaxially with and secured to respective cutters of said shears.

14. A tire-trimming machine comprising two pairs of rotary shears spaced apart longitudinally of the work and adapted to trim the respective beads of a tire as the latter is rotated past them, rollers coaxial with the cutters of said shears for positioning the work with relation to the latter, and guiding means for holding the tire to a fixed orbit as it is so rotated.

15. A tire-trimming machine comprising two pairs of rotary shears adapted to trim the respective beads of a tire as the latter is rotated past them, drive rollers acting upon the respective bead portions of the tire for so rotating the latter, and guiding means for holding the tire to a fixed orbit as it is so rotated.

16. A tire-trimming machine comprising a pair of rotary shears mounted upon substantially vertical axes and adapted to trim a bead of a tire as the latter is rotated past them, one cutter of said shears being adapted to be straddled by the bead portions of the tire as the latter is mounted thereon, a roller projecting above said cutter, coaxial therewith, and adapted to run on an inner face of the tire, and a guide member over said roller, upwardly tapered in vertical section, so as automatically to spread the bead portions of the tire and cause them to straddle said roller and cutter as the tire is hung thereon.

17. A tire-trimming machine comprising two pairs of rotary shears mounted on substantially vertical axes and adapted to trim the respective bead portions of a tire as the latter is rotated past them, rollers adapted to position the work with relation to said shears, and a tapered guide member positioned thereover and adapted to spread apart the bead portions of a tire as the latter is hung thereon and to guide said bead portions into operative relation to said rollers and shears.

18. A tire-trimming machine comprising two pairs of rotary shears adapted to trim the respective beads of a tire, means for automatically positioning the bead portions of a tire, hung thereon, with relation to said shears, guide rollers adapted to run on the heels of the tire-beads to hold them in operative relation to said shears, and means common to said rollers for concurrently moving the same into or out of operative position.

19. A tire-trimming machine comprising two pairs of rotary shears adapted to trim the respective beads of a tire, rollers coaxial with the cutters of said shears for positioning the work with relation thereto, presser rollers adapted to run upon the heels of the beads for holding them against the first said rollers, mountings for said presser rollers, and a spring device interposed operatively between said mountings so as to press said presser rollers with equal force against the work.

20. A tire-trimming machine comprising means for supporting a tire and rotating it in its own plane, and a pair of rotary shears adapted to trim a bead of the tire as it is so rotated, the cutters of said shears being mounted upon axes disposed at a slight angle to each other so that their cutting edges are closer together at the shearing point than at any other.

21. A tire-trimming machine comprising means for supporting a tire and rotating it in its own plane, and a pair of rotary shears adapted to trim a bead of the tire as it is so rotated, the cutters of said shears being non-yieldingly held in shearing relation to each other.

22. A tire-trimming machine comprising a pair of rotary shear blades rigidly secured on respective shafts, a shaft-driving member mounted in a fixed position, one of said shafts being splined therein, and means for minutely adjusting the last mentioned shaft longitudinally in said driving member.

23. A tire-trimming machine comprising an overhanging gear-case adapted to be filled with oil, and means mounted on said gear-case for supporting and peripherally driving a tire and trimming mold fins therefrom, said means comprising shafts disposed radially of the work and extending through the cover of said gear-case, driving and trimming devices mounted on the upper ends of said shafts, and means within said gear-case for driving said shafts.

24. A tire-trimming machine comprising an overhanging gear-case adapted to be filled with oil, and means mounted on said gear-case for supporting and peripherally driving a tire and trimming mold fins therefrom, said means comprising shafts disposed radially of the work and extending through the cover of said gear-case, a pair of rotary shears secured to the tops of a pair of said shafts, means on the exterior of said gear-case for axially adjusting one of the shafts of said pair, and means in said gear-case for driving said shafts, said means being adapted to drive the adjusted shaft in different adjusted positions.

25. The method of trimming mold fins from tires which comprises supporting and rotating the tire in its own plane, progressively spreading the tire open at its bead portions as it is so rotated, and progressively trimming a mold fin from a bead of the tire at a station where the latter is so spread.

26. The method of trimming mold fins from tires which comprises supporting and rotating the tire in its own plane, progressively spreading the tire open at its bead portions as it is so rotated, progressively trimming mold fins from the beads of the tire at a station where it is so spread, and concurrently trimming a mold fin from the tread of the tire.

27. A tire-trimming machine comprising means for supporting and circumferentially rotating a tire and a V-knife so mounted adjacent thereto as to be positionable in trimming relation to the tire, the said V-knife being of the plane type, having a substantially plane face adapted to bear upon the work to prevent excessive depth of cut and a V-notch in the margin of the said face, the said V-knife being of the plane type, having a substantially plane face adapted to bear upon the work to prevent excessive depth of cut and a V-notch in the margin of the said face.

In witness whereof I have hereunto set my hand this 2nd day of October, 1923.

JOHN R. GAMMETER.